(12) United States Patent
Maher, III et al.

(10) Patent No.: US 7,272,115 B2
(45) Date of Patent: Sep. 18, 2007

(54) METHOD AND APPARATUS FOR ENFORCING SERVICE LEVEL AGREEMENTS

(75) Inventors: Robert Daniel Maher, III, Plano, TX (US); James Robert Deerman, Lucas, TX (US); Milton Andre Lie, McKinney, TX (US); Mark Warden Hervin, Plano, TX (US)

(73) Assignee: AudioCodes Texas, Inc., Plano, TX (US)

( * ) Notice: Subject to any disclaimer, the term of this patent is extended or adjusted under 35 U.S.C. 154(b) by 869 days.

(21) Appl. No.: 10/260,768

(22) Filed: Sep. 30, 2002

(65) Prior Publication Data

US 2003/0118029 A1      Jun. 26, 2003

Related U.S. Application Data

(63) Continuation of application No. 09/653,521, filed on Aug. 31, 2000, now abandoned.

(51) Int. Cl.
| | |
|---|---|
| H04L 12/26 | (2006.01) |
| H04L 1/00 | (2006.01) |
| H04J 3/14 | (2006.01) |
| G06F 15/16 | (2006.01) |
| G01R 31/08 | (2006.01) |
| G06F 11/00 | (2006.01) |

(52) U.S. Cl. ...................................... 370/253; 709/224

(58) Field of Classification Search ................ 370/253, 370/395, 428, 254, 235–238; 709/231, 219–229, 709/230
See application file for complete search history.

(56) References Cited

U.S. PATENT DOCUMENTS 5,757,771 A      5/1998   Li et al.

(Continued)

OTHER PUBLICATIONS

Freeman, John K., "Network Processors," A Supplement to CMP Media Inc's Electronics Publications, May 2000, pp. 3, 5-9, 14-16, 18, 20-22, 24-26, 28 and 30.

(Continued)

*Primary Examiner*—Chi Pham
*Assistant Examiner*—Prenell Jones
(74) *Attorney, Agent, or Firm*—Haynes and Boone, LLP

(57) ABSTRACT

A network device for enforcing service level agreements is described that is able to scan the contents of entire data packets including header and payload information. The network device includes memory for storing subscriber information, policies and statistics. The traffic flow scanning processor scans the header and payload information from each data packet, which is used to associate each data packet with a particular subscriber, classify the type of network traffic in the data packet and to enforce the particular policies associated with the subscriber. The traffic flow scanning processor produces a treatment for the data packet based on the scanning. The scanned data packets and the associated treatments are then passed to a quality of service processor, which modifies the data packets if necessary and enforces resource allocation according to the preprogrammed policies.

13 Claims, 5 Drawing Sheets

U.S. PATENT DOCUMENTS

| | | | |
|---|---|---|---|
| 5,813,001 | A | 9/1998 | Bennett |
| 5,898,669 | A | 4/1999 | Shimony |
| 6,104,700 | A | 8/2000 | Haddock et al. |
| 6,185,736 | B1 | 2/2001 | Ueno |
| 6,195,697 | B1 | 2/2001 | Bowman-Amuah |
| 6,208,661 | B1 | 3/2001 | Marshall |
| 6,282,208 | B1 | 8/2001 | Bowcutt et al. |
| 6,687,247 | B1 * | 2/2004 | Wilford et al. ............. 370/392 |
| 6,788,647 | B1 * | 9/2004 | Mohaban et al. ........... 370/235 |
| 6,865,185 | B1 * | 3/2005 | Patel et al. ................. 370/412 |
| 6,980,555 | B2 * | 12/2005 | Mar ...................... 370/395.21 |

OTHER PUBLICATIONS

Yener, Bulent, "Smartbox: An Add-On Solution for Guaranteed QoS," The USENIX Association, Mar. 20, 2000, 11 pages.
"Advanced QoS Services for the Intelligent Internet," Cisco Systems, Inc., White Paper, Jun. 30, 2000, 10 pages.
"Automated Service Provisioning and Management: Enabling the Rapid Deployment of IP Services," Ennovate Networks, White Paper, pp. 3-11.
"The Challenge for Next Generation Network Processors," Agere, Inc., White Paper, Sep. 10, 1999, 7 pages.
"The Challenge of Service Level Management," InfoVista Corporation, 1999, 35 pages.
"Considerations for Large Scale IP Subscriber and Service Management," RedBack Networks, 2000, 11 pages.
"Digital Island's Quality of Service (QoS): Delivering QoS With Digital Island's Distributed-Star Architecture," Apr. 1999, pp. 3, 5, 7.
"Enabling Multiple Broadband Access Technologies and Services," RedBack Networks, 6 pages.
"Fast Pattern Processor Application Note," Agere, Inc., Revision 0.4, Jun. 28, 1999, 16 pages.
International Search Report mailed Jan. 24, 2002 for corresponding PCT Application No. PCT/US01/22860, 4 pages.
"Implementing an Intellegent Service Gateway Architecture," RedBack Networks, 4 pages.
"IP Service Creation Architecture: Prerequisite to Service Provider Profitability," Ennovate Networks, White Paper, pp. 3-11.
"IP Service Intelligence at the Edge: Enabling Value-Added Services Over DSL," Copper Mountain Networks, Inc. and Spring Tide Networks, Inc., Apr. 2000, 18 pages.
"IT Quality of Service Management Solutions", InfoVista Corporation, Technology White Paper, Mar. 1997, 28 pages.
"An Overview of QoS," MicroSoft TechNet White Paper, Edgar Online, 49 pages.
"Strengths of the Redback Subscriber Management System", Redback Networks, 1999, 9 pages.

* cited by examiner

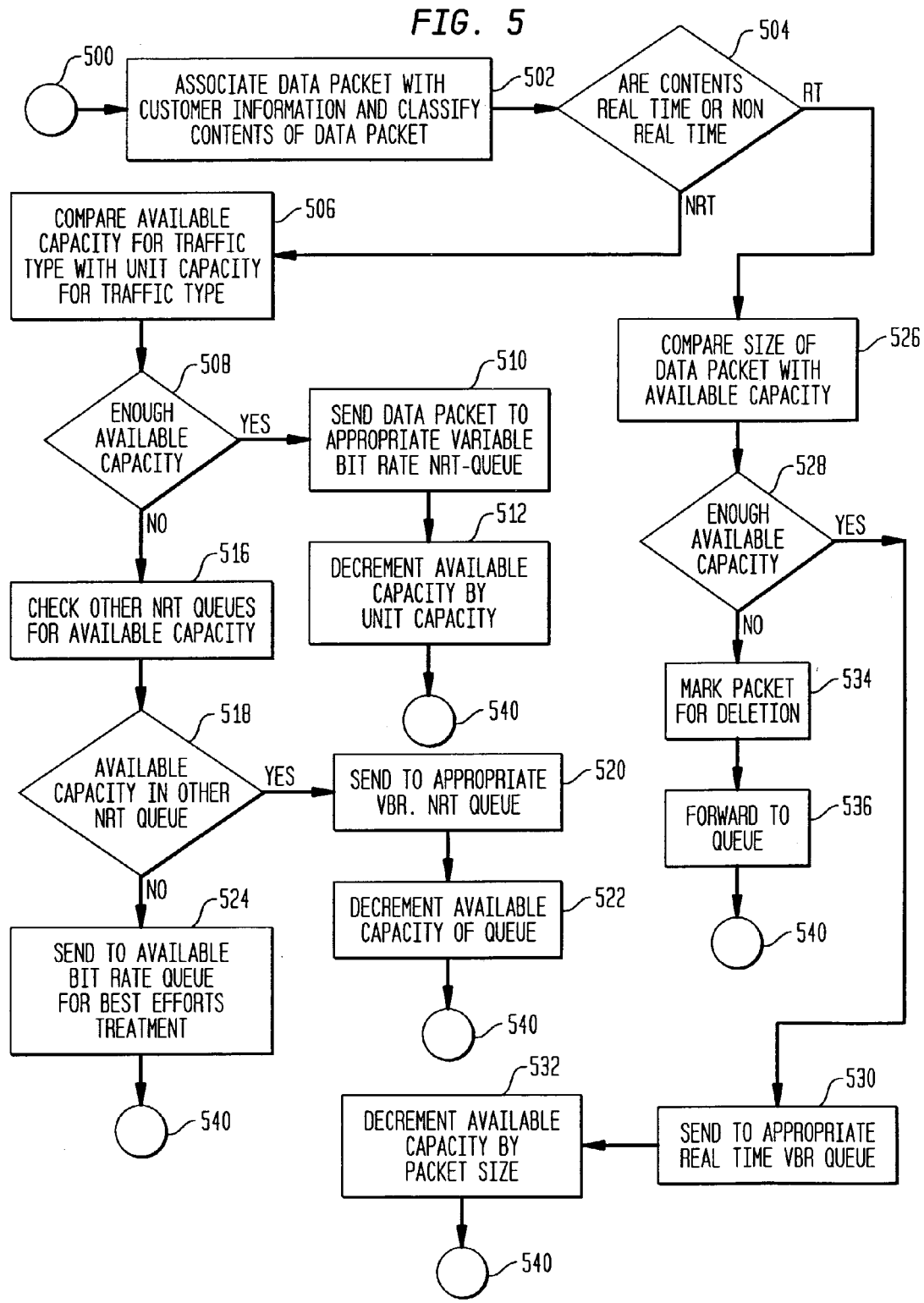

METHOD AND APPARATUS FOR ENFORCING SERVICE LEVEL AGREEMENTS

CROSS-REFERENCE TO RELATED APPLICATIONS

This application is a continuation of application Ser. No. 09/653,521 which was filed on Aug. 31, 2000 now abandoned.

TECHNICAL FIELD OF THE INVENTION

The present invention relates to broadband data networking equipment. Specifically, the present invention relates to a method and network device that is able to classify network traffic based on type and application and to shape and manage network traffic in order to enforce Service Level Agreements.

BACKGROUND OF THE INVENTION

Almost everyone is using Internet and web-based services as a primary means of conducting business. Services such as email, e-commerce, Voice over IP (VoIP), and web-browsing have become critical to communication within and across organizations. As reliance on network based services increase, so do consumer demands for availability reliability, and responsiveness of the services. Typically, the customers do not care how the service is composed, to them the quality of service (QoS) is what is important. These quality of service expectations are driving customers to negotiate guarantees with their service providers that will meet customer service requirements for specific QoS levels. In order to offer end-to-end QoS guarantees to customers, more and more providers and customers are entering into Service Level Agreements (SLAs).

An SLA is a contract between a provider and a customer that guarantees specific levels of performance and reliability for a certain cost. Traditionally, SLAs have included performance guarantees such as response time and network availability, in addition to specifying customer support and help desk issues. One major problem with SLAs, however, is that they are limited to collecting statistical information on network performance and availability since the current state of the art does not allow manipulation of the network itself or the data flowing over the network at wire speed. Because SLAs are enforced after the fact based on statistical information, the only recourse to both provider and customer is an adjustment to payments or credits applied for future services.

Technology that would allow real time monitoring and dynamic allocation of network resources would allow providers and customers to take SLAs and service level management (SLM) to the next level. Such a technology would identify network resources that were reaching their maximum performance and allow the network to dynamically allocate additional resources, which could be metered and billed to the customer. Additionally, the customers would not be limited to resources in increments of carrier size, such as D3s, T1s or T3s, but instead would be able to specify their exact requirement and pay for exactly the resources consumed.

Further, new technology could be incorporated to include security features such as prevention of denial of service and monitoring for email viruses and worms. This would allow the provider to differentiate his services from other providers and would provide content that could be charged for by the provider. The customer would benefit by increased availability of their resources as well as being able to offload the expense of installing and maintaining security equipment to the provider.

Accordingly, what is needed is a network device that can enforce service level agreements by being able to recognize network traffic at wire speeds and by dynamically modifying the traffic or the network to accommodate performance and resource policies agreed to between the provider and customer. Further, the network device is able to provide security for the network that is maintained by the provider as a service to the customer.

SUMMARY OF THE INVENTION

The present invention provides for a network device or apparatus that is able to enforce service level agreements between providers and customers. The network device includes memory, which contains information specific to each customer, or subscriber. The memory also includes policies defined to enforce the terms of the service level agreements such as resource allocation and particular service levels, as well as statistics that are kept for each subscriber allowing the provider to provide metering and billing, as well as to allow the subscriber to keep detailed information on the subscribers network usage. The memory is connected to a traffic flow scanning processor which is operable to scan both the header and payload of all data packets flowing through the network device. The traffic flow scanning processor scans each packet to associate it with a particular subscriber and to identify the type and nature of the network traffic. Once the subscriber and type of traffic have been identified, the policies for that subscriber can be enforced and events or statistics can be logged. This is accomplished by the traffic flow scanning processor determining a treatment for each data packet based on the scanning and preprogrammed policies. This treatment and the data packet itself are forwarded to a quality of service processor connected to the traffic flow scanning processor. The quality of service processor modifies the data packet, if necessary, and assigns it to a quality of service queue based on the treatment.

Further, the present invention sets forth a method for enforcing resource allocation defined by a service level agreement. The method associates each data packet with a subscriber, or customer, and classifies the data packet by traffic type, each traffic type being further classified as either real time or non-real time. Once the packet is classified and associated with a subscriber, the method checks for available bandwidth according to the preprogrammed policies for that subscriber. The data packet is then sent to the appropriate quality of service queue for transmission back onto the network.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 5 is a flow chart illustrating a method according to the present invention for enforcing resource allocation according to a Service Level Agreement.

DETAILED DESCRIPTION OF THE DRAWINGS

Figure 1:
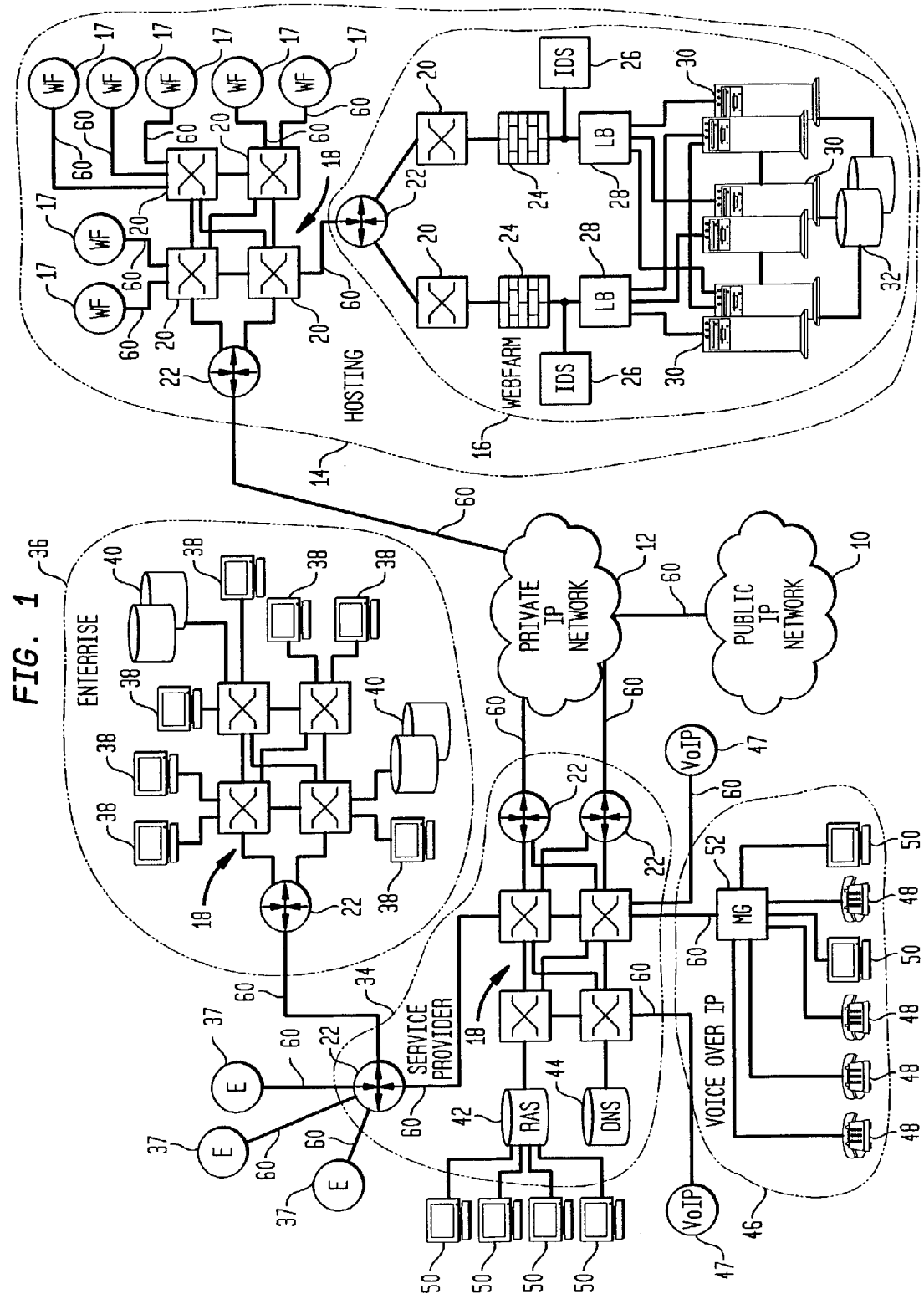
FIG. 1 is a network topology diagram illustrating example environments in which the present invention can operate.

Referring now to FIG. 1, a network topology is shown which is an example of several network infrastructures that connect in some manner to a broader public IP network 10 such as the internet. FIG. 1 is in no way meant to be a precise network architecture, but only to serve as a rough illustration of a variety of network structures which can exist on a broadband IP network. Public IP network 10 can be accessed in a variety of ways. FIG. 1 shows the public IP network being accessed through a private IP network 12 which can be the IP network of a company such as MCI or UUNET which provide private core networks. An endless variety of network structures can be connected to private IP network 12 in order to access other networks connected to private IP network 12 or to access public IP network 10.

One example of a network structure connecting to private IP network 12 is hosting network 14. Hosting network 14 is an example of a network structure that provides hosting services for internet websites. These hosting services can be in the form of webfarm 16. Webfarm 16 begins with webservers 30 and database 32 which contain the webpages, programs and databases associated with a particular website such as amazon.com or yahoo.com. Webservers 30 connect to redundant load balancers 28 which receive incoming internet traffic and assign it to a particular webserver to balance the loads across all of webservers 30. Redundant intrusion detection systems 26 and firewalls connect to load balancers 28 and provide security for webfarm 16. Individual webfarms 16 and 17 connect to hosting network 14's switched backbone 18 by means of a network of switches 20 and routers 22. Hosting network 14's switched backbone 18 is itself made up of a network of switches 20 which then connect to one or more routers 22 to connect to private IP network 12. Connections between individual webfarms 16 and 17 and the switched backbone 18 of hosting network 14 are usually made at speeds such as OC-3 or OC-12 (approx. 150 megabits/sec or 625 megabits/sec), while the connection from router 22 of hosting network 14 to private IP network 12 are on the order OC-48 speeds (approx. 2.5 gigabits/sec).

Another example of network structures connecting to private IP networks are illustrated with service provider network 34. Service provider network 34 is an example of a network structure for Internet Service Providers (ISPs) or Local Exchange Carriers (LECs) to provide both data and voice access to private IP network 12 and public IP network 10. Service provider network 34 provides services such as internet and intranet access for enterprise networks 36 and 37. Enterprise networks 36 and 37 are, for example, company networks such as the company network for Lucent Technologies or Merrill Lynch. Each enterprise network, such as enterprise network 36, includes a plurality of network servers and individual workstations connected to a switched backbone 18, which can be connected by routers 22 to service provider network 34.

In addition to internet access for enterprise networks, service provider network 34 provides dial-up internet access for individuals or small businesses. Dial-up access is provided in service provider network 34 by remote access server (RAS) 42, which allows personal computers (PCs) to call into service provider network 34 through the public switched telephone network (PSTN), not shown. Once a connection has been made between the PC 50 and RAS 42 through the PSTN, PC 50 can then access the private or public IP networks 12 and 10.

Service provider network 34 also provides the ability to use the internet to provide voice calls over a data network referred to as Voice over IP (VoIP). VoIP networks 46 and 47 allow IP phones 48 and PCs 50 equipped with the proper software to make telephone calls to other phones, or PCs connected to the internet or even to regular phones connected to the PSTN. VoIP networks, such as VoIP network 46, include media gateways 52 and other equipment, not shown, to collect and concentrate the VoIP calls which are sent through service provider network 34 and private and public internet 12 and 10 as required. As mentioned, the advent of VoIP as well as other real time services such as video over the internet make quality of service a priority for service providers in order to match the traditional telephone service provided by traditional telephone companies.

Service providers often enter into service level agreements with their customers. These service level agreements set out service and availability requirements, which are then monitored and statistics collected. These statistics are used to determine whether the service provider met, failed to meet, or exceeded the service levels set out in the service level agreement. The service provider can then be subject to either monetary penalties or rewards for the level of service provided.

Service provider network 34 includes a switched backbone 18 formed by switches 20 as well as routers 22 between it and its end users and between it and private IP network 12. Domain name servers 44 and other networking equipment, which are not shown, are also included in service provider network 34. Similar to hosting network 34, connection speeds for service provider network 34 can range from speeds such as T1, T3, OC-3 and OC-12 for connecting to enterprise networks 36 and 37 as well as VoIP networks 46 and 47 all the way to OC-48 and conceivably even OC-192 for connections to the private IP network.

It can easily be seen that aggregation points 60 exist at the edges of these various network structures where data is passed from one network structure to another at speeds such as OC-3, OC-12, and OC-48. One major problem in the network structures shown in FIG. 1 is the lack of any type of intelligence at these aggregation points 60 which would allow the network to provide services such as security, metering and quality of service. The intelligence to provide these services would require that the network understand the type of data passing through the aggregation points 60 and not just the destination and/or source information which is currently all that is understood. Understanding the type of data, or its contents, including the contents of the associated payloads as well as header information, and further understanding and maintaining a state awareness across each individual traffic flow would allow the network to configure itself in real time to bandwidth requirements on the network for applications such as VoIP or video where quality of service is a fundamental requirement. An intelligent, or "content aware", network would also be able to identify and filter out security problems such as email worms, viruses, denial of service (DoS) attacks, and illegal hacking in a manner that would be transparent to end users. Further, a content aware network would provide for metering capabilities by hosting companies and service providers, allowing these companies to regulate the amount of bandwidth allotted to individual customers as well as to charge precisely for bandwidth and additional features such as security.

In accordance with the requirements set forth above, the present invention provides for a network device that is able to scan, classify, and modify network traffic including payload information at speeds of OC-3, OC-12, OC-48 and greater thereby providing a "content aware" network.

Figure 2:
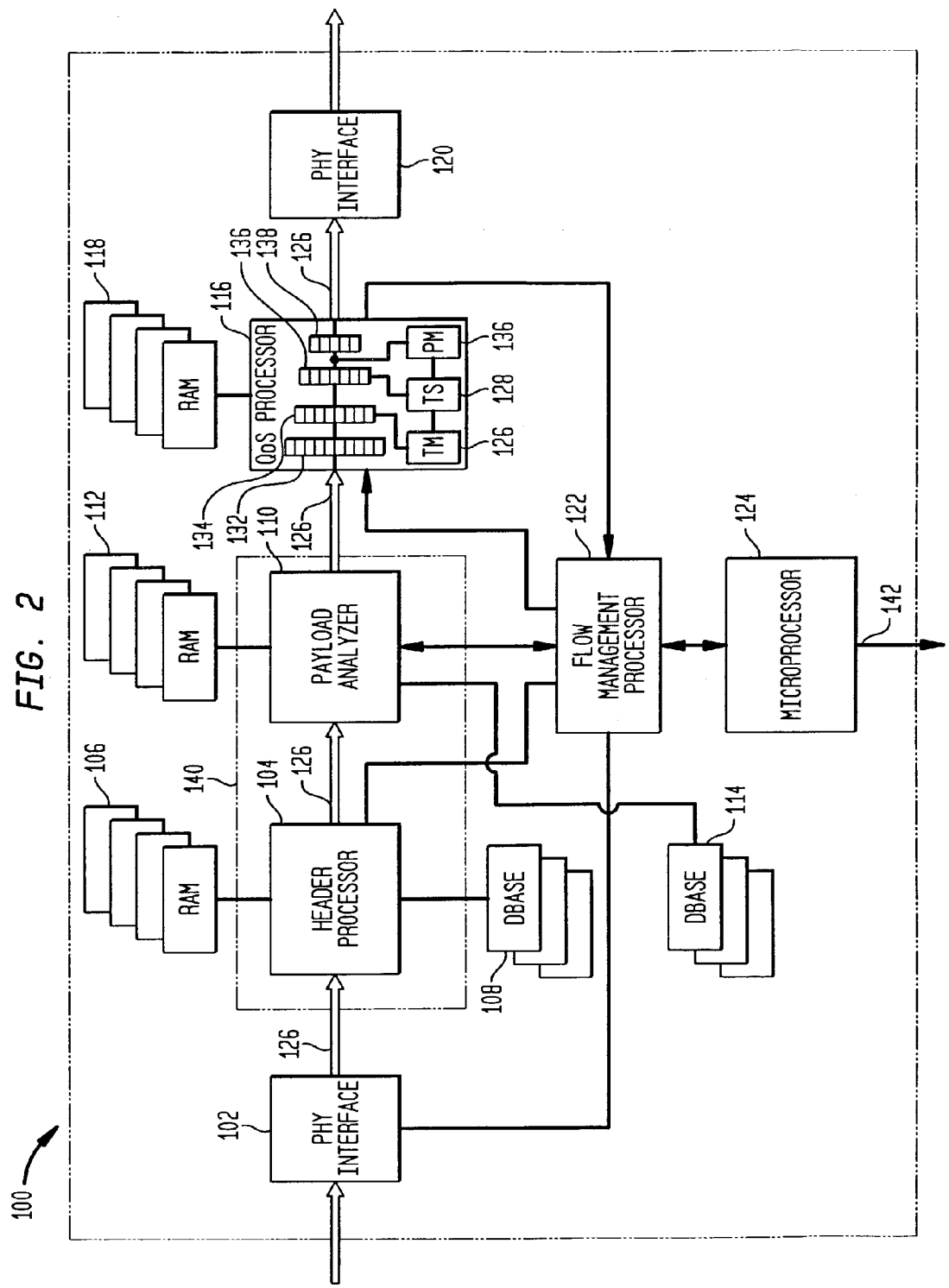
FIG. 2 is a block diagram of a "bump-in-the-line" network apparatus according to the present invention.

Referring now to FIG. 2, one embodiment of a network apparatus according to the present invention is shown. Network apparatus 100, as shown, acts as a "bump-in the-line" type device by accepting data received from a high-speed network line, processing the data, and then placing the data back on the line. Network apparatus 100 accepts data from the line by means of input physical interface 102. Input physical interface 102 can consist of a plurality of ports, and can accept any number of network speeds and protocols, including such high speeds as OC-3, OC-12, OC-48, and protocols including 10/100 Ethernet, gigabit Ethernet, and SONET. Input physical interface 102 takes the data from the physical ports, frames the data, and then formats the data for placement on fast-path data bus 126 which is preferably an industry standard data bus such as a POS-PHY Level 3, or an ATM UTOPIA Level 3 type data bus.

Fast-path data bus 126 feeds the data to traffic flow scanning processor 140, which includes header processor 104 and payload analyzer 110. The data is first sent to header processor 104, which is operable to perform several operations using information contained in the data packet headers. Header processor 104 stores the received data packets in packet storage memory 106 and scans the header information. The header information is scanned to identify the type, or protocol, of the data packet, which is used to determine routing information as well as to create a session id using predetermined attributes of the data packet.

In the preferred embodiment, a session id is created using session information consisting of the source address, destination address, source port, destination port and protocol, although one skilled in the art would understand that a session id could be created using any subset of fields listed or any additional fields in the data packet without departing from the scope of the present invention. In addition, the header information is used to identify the data packet with a particular customer or subscriber. When a data packet is received that has new session information the header processor creates a unique session id to identify that particular traffic flow. Each successive data packet with the same session information is assigned the same session id to identify each packet within that flow. Session ids are retired when the particular traffic flow is ended through an explicit action, or when the traffic flow times out, meaning that a data packet for that traffic flow has not been received within a predetermined amount of time. While the session id is discussed herein as being created by the header processor 104 the session id can be created anywhere in traffic flow scanning engine 140 including in payload analyzer 110.

As will be discussed below, network apparatus 100 in order to function properly needs to reorder out of order data packets and reassemble data packet fragments. Header processor 104 is operable to perform the assembly of asynchronous transfer mode (ATM) cells into complete data packets (PDUs), which could include the stripping of ATM header information.

Header processor 104 is also operable to perform routing functions. Routing tables and information can be stored in database memory 108. Routing instructions received by network apparatus 100 are identified, recorded and passed to microprocessor 124 by header processor 104 so that microprocessor 124 is able to update the routing tables in database memory 108 accordingly. While network apparatus 100 is referred to as a "bump-in-the-line" apparatus, The input and the output could be formed by multiple lines, for example four OC-12 lines could be connected to network apparatus 100 which operates at OC-48 speeds. In such a case, "bump-in-the-line" network apparatus 100 will have limited routing or switching capabilities between the multiple lines, although the switching capability will be less than in a conventional router or switch. Additionally, a network apparatus can be constructed according to the principles of the present invention, which is able to operate as a network router or switch. Such an implementation is discussed in greater detail with reference to FIG. 4.

After data packets have been processed by header processor 104 the data packets, their associated session id and any conclusion formed by the header processor, such as routing or QoS information, are sent on fast-data path 126 to the other half of traffic flow scanning engine 140, payload analyzer 110. The received packets are stored in packet storage memory 112 while they are processed by payload analyzer 110. Payload analyzer 110 is operable to scan the contents of data packets received from header processor 104, particularly the payload contents of the data packets, although header information can also be scanned as required. The contents of any or all data packets are compared to a database of known signatures and if the contents of a data packet or packets match a known signature, an action associated with that signature and/or session id can be taken by network apparatus 100. Additionally, payload analyzer 110 is operable to maintain state awareness throughout each individual traffic flow. In other words, payload analyzer 110 maintains a database for each session which stores state information related to not only the current data packets from a traffic flow, but state information related to the entirety of the traffic flow. This allows network apparatus 100 to act on not only based on the content of the data packets being scanned but also based on the contents of the entire traffic flow.

Payload analyzer 110 is also used to store subscriber information, policies, events and statistics used in the enforcement of service level agreements. The policies, which can be customized to an individual subscriber or a group of subscribers, can set out service parameters such as available bandwidth for the subscriber, available bandwidth for certain types of network traffic, real time and non-real time, within the subscribers total bandwidth, security level for the subscriber, etc. Events allow the tracking of content-based occurrences outside the scope of currently kept statistics. Event tracking allows a more detailed profile of each subscriber to be learned and maintained. The statistics allow metering by the provider which can be used, for example, to charge the customer for additional services and bandwidth provided to the subscriber as well as to keep detailed track of the subscribers network activity. The specific operation of payload analyzer 110 will be described with reference to FIG. 3.

Once the contents of the packets have been scanned and a conclusion, or treatment, is reached by traffic flow scanning engine 140, the packets and the associated conclusions of either or both the header processor and the payload analyzer are sent to quality of service (QoS) processor 116. QoS processor 116 again stores the packets in its own packet storage memory 118 for forwarding. QoS processor 116 is operable to perform the traffic flow management for the stream of data packets processed by network apparatus 100. QoS processor contains engines for traffic management 126, traffic shaping 128 and packet modification 130.

QoS processor 116 takes the conclusion, or treatment, of either or both of header processor 104 and payload analyzer 110 and assigns the data packet to one of its internal quality of service queues 132 based on the conclusion. The quality of service queues 132 can be assigned priority relative to one another or can be assigned a maximum or minimum percentage of the traffic flow through the device. This allows QoS processor to assign the necessary bandwidth to traffic flows such as VoIP, video and other flows with high quality and reliability requirements while assigning remaining bandwidth to traffic flows with low quality requirements such as email and general web surfing to low priority queues. Information in queues that do not have the available bandwidth to transmit all the data currently residing in the queue according to the QoS engine is selectively discarded thereby removing that data from the traffic flow.

The quality of service queues 132 also allow network apparatus 100 to manage network attacks such as denial of service (DoS) attacks. Network apparatus 100 can act to qualify traffic flows by scanning the contents of the packets and verifying that the contents contain valid network traffic between known sources and destinations. Traffic flows that have not been verified because they are from unknown sources or because they are new unclassified flows can be assigned to a low quality of service queue until the sources are verified or the traffic flow classified as valid traffic. Since most DoS attacks send either new session information, data from spoofed sources, or meaningless data, network apparatus 100 would assign those traffic flows to low quality traffic queues. This ensures that the DoS traffic would receive no more than a small percentage (i.e. 5%) of the available bandwidth thereby preventing the attacker from flooding downstream network equipment.

The QoS queues 132 in QoS processor 116 (there are 65 k queues in the present embodiment of the QoS processor although any number of queues could be used) have multiple associated class of service (CoS) queues which feed into schedulers 134 (1024 in the present embodiment), which feed into logic ports 136 (256 in the present embodiment), which send the data to flow control port managers 138 (32 is the present embodiment) which can correspond to physical egress ports for the network device. The traffic management engine 126 and the traffic shaping engine 128 determine the operation of the schedulers and logic ports in order to maintain traffic flow in accordance with the programmed parameters.

QoS queues 132 are also used in enforcing resource allocation defined in service level agreements. Queues 132 can be assigned to subscribers and traffic types and can also be given programmable capacities to manage resource allocation on a subscriber level and even on individual traffic types for the subscriber. Enforcing resource allocation in service level agreements is described in greater detail with reference to FIG. 5.

QoS processor 116 also includes packet modification engine 130, which is operable to modify, add, or delete bits in any of the fields of a data packet. This allows QoS processor 116 to change addresses for routing or to place the appropriate headers on the data packets for the required protocol. The packet modification engine 130 can also be used to change information within the payload itself if necessary. Data packets are then sent along fast-data path 126 to output PHY interface 120 where it is converted back into an analog signal and placed on the network.

As with all network equipment, a certain amount of network traffic will not be able to be processed along fast-data path 126. This traffic will need to be processed by on board microprocessor 124. The fast-path traffic flow scanning engine 140 and QoS processor 116 send packets requiring additional processing to flow management processor 122, which forwards them to microprocessor 124 for processing. The microprocessor 124 then communicates back to traffic flow scanning engine 140 and QoS processor 116 through flow management processor 122. Flow management processor 122 is also operable to collect data and statistics on the nature of the traffic flow through network apparatus 100. In addition to processing odd, or missing packets, microprocessor 124 also controls the user management interface 142 and recompiles databases 108 and 114 to accommodate new signatures and can be used to learn and unlearn sessions identified by the traffic flow scanning engine 140.

The abilities of network apparatus 100 are unique in a number of respects. Network apparatus 100 has the ability to scan the contents of any data packet or packets for any information that can be represented as a signature or series of signatures. The signatures can be of any arbitrary length, can begin and end anywhere within the packets and can cross packet boundaries. Further, network apparatus 100 is able to maintain state awareness throughout all of the individual traffic flow by storing state information for each traffic flow representing any or all signatures matched during the course of that traffic flow. Existing network devices operate by looking for fixed length information at a precise point within each data packet and cannot look across packet boundaries. By only being able to look at fixed length information at precise points in a packet, existing network equipment is limited to acting on information contained at an identifiable location within some level of the packet headers and cannot look into the payload of a data packet much less make decisions on state information for the entire traffic flow or even on the contents of the data packet including the payload.

Figure 3:
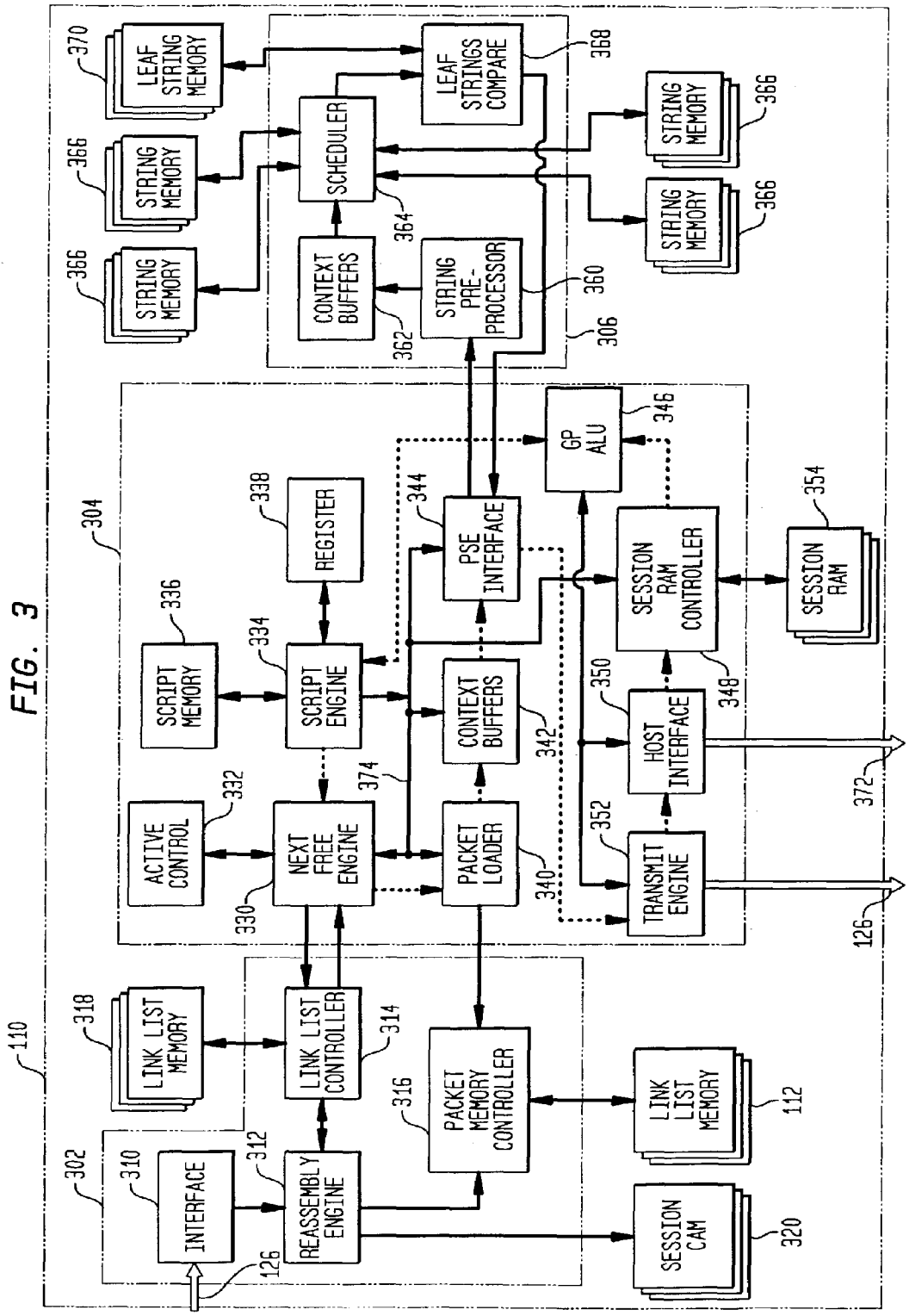
FIG. 3 is a block diagram of the payload scanning engine from FIG. 2.

Referring now to FIG. 3, the payload analyzer 110 of FIG. 2 is described in greater detail. As described above, payload analyzer 110 is operable to scan the contents of data packets forwarded from header processor 104 from FIG. 2. Payload analyzer 110 includes three separate engines, queue engine 302, context engine 304, and payload scanning engine 306.

Since payload analyzer 110 scans the contents of the payload, and is able to scan across packet boundaries, payload analyzer 110 must be able to reassemble fragmented packets and reorder out of order packets on a per session basis. Reordering and reassembling is the function of queue engine 302. Queue engine 302 receives data off the fast-path data bus 126 using fast-path interface 310. Packets are then sent to packet reorder and reassembly engine 312, which uses packet memory controller 316 to store the packets into packet memory 112. Reordering and reassembly engine 312 also uses link list controller 314 and link list memory 318 to develop detailed link lists that are used to order the data packets for processing. Session CAM 320 can store the session id generated by queue engine 302 of payload analyzer 110. Reordering and reassembly engine 312 uses the session id to link data packets belonging to the same data flow.

In order to obtain the high throughput speeds required, payload analyzer 110 must be able to process packets from multiple sessions simultaneously. Payload analyzer 110 processes blocks of data from multiple data packets each belonging to a unique traffic flow having an associated session id. In the preferred embodiment of the present invention, payload analyzer 110 processes 64 byte blocks of 64 different data packets from unique traffic flows simultaneously. Each of the 64 byte blocks of the 64 different data flows represents a single context for the payload analyzer. The scheduling and management of all the simultaneous contexts for payload analyzer 10 is handled by context engine 304.

Context engine 304 works with queue engine 302 to select a new context when a context has finished processing and been transmitted out of payload analyzer 110. Next free context/next free block engine 330 communicates with link list controller 314 to identify the next block of a data packet to process. Since payload analyzer 110 must scan data packets in order, only one data packet or traffic flow with a particular session id can be active at one time. Active control list 332 keeps a list of session ids with active contexts and checks new contexts against the active list to insure that the new context is from an inactive session id. When a new context has been identified packet loader 340 uses the link list information retrieved by the next free context/next free block engine to retrieve the required block of data from packet memory 112 using packet memory controller 316. The new data block is then loaded into a free buffer from context buffers 342 where it waits to be retrieved by payload scanning engine interface 344.

Payload scanning engine interface 344 is the interface between context engine 304 and payload scanning engine 306. When payload scanning engine 306 has room for a new context to be scanned, payload scanning engine interface 344 sends a new context to string preprocessor 360 in payload scanning engine 306. String preprocessor 360 is operable to simplify the context by performing operations such as compressing white space (i.e. spaces, tabs, returns) into a single space to simplify scanning. Once string preprocessor 360 has finished, the context is loaded into one of the buffers in context buffers 362 until it is retrieved by scheduler 364. Scheduler controls the input and output to signature memory 366. While four signature memories 366, each of which is potentially capable of handling multiple contexts, are shown any number could be used to increase or decrease the throughput through payload scanning engine 110. In the present embodiment, each of the signature memories 366 is capable of processing four contexts at one time.

One of the signature memories 366 is assigned the context by scheduler 364 and then compares the significant bits of the context to the database of known strings that reside in signature memory 366. The signature memory 366 determines whether there is a potential match between the context and one of the known signatures using significant bits, which are those bits that are unique to a particular signature. If there is a potential match, the context and the potentially matched string are sent to leaf string compare 368 which uses leaf string memory 370 to perform a bit to bit comparison of the context and the potentially matched string.

The conclusion of the payload scanning are then sent back to the payload scanning interface 344 along with possibly a request for new data to be scanned. The conclusion of the payload scanning can be any of a number of possible conclusions. The scanning may not have reached a conclusion yet and may need additional data from a new data packet to continue scanning in which case the state of the traffic flow and any incomplete scans are stored in session memory 354 along with other appropriate information such as sequence numbers, counters etc. The conclusion reached by signature memory 366 may also be that scanning is complete and there is or isn't a match, in which case the data packet and the conclusion are sent to transmit engine 352 for passing to QoS processor 116 from FIG. 2. The scanning could also determine that the data packet needs to be forwarded to microprocessor 124 from FIG. 2 for further processing, so that the data packet is sent to host interface 350 and placed on host interface bus 372. In addition to handling odd packets, host interface bus 350 allows microprocessor 124 to control any aspect of the operation of payload analyzer 110 by letting microprocessor 124 write to any buffer or register in context engine 304.

State information is stored in session memory 354 and is updated as necessary after data associated with the particular traffic flow is scanned. The state information for each traffic flow represents the content awareness of network apparatus 100 from FIG. 2, and allows network apparatus to act not only on the information scanned, but also on all the information that has been scanned for each traffic flow. Session memory 354 also stores subscriber information, policies and statistics that are used in the enforcement of service level agreements. Information, policies and statistics can be stored for each individual subscriber to allow the network device to provide subscriber management at very fine resolution.

The operation of transmit engine 352, host interface 350, session memory controller 348, which controls the use of session memory 354, and of general-purpose arithmetic logic unit (GP ALU) 346, which is used to increment or decrement counter, move pointers, etc., is controlled by script engine 334. Script engine 334 operates to execute programmable scripts stored in script memory 336 using registers 338 as necessary. Script engine 334 uses control bus 374 to send instruction to any of the elements in context engine 304.

As can be seen from the description of FIG. 3, payload analyzer 110 allows the entire contents of any or all data packets received by a network device to be scanned against a database of known signatures. The scanned contents can be any variable or arbitrary length and can even cross packet boundaries. The abilities of payload analyzer 110 allow the construction of a network device that is content aware which gives the network device the ability to operate on data packets based on the content of that data packet as has already been described herein.

Figure 4:
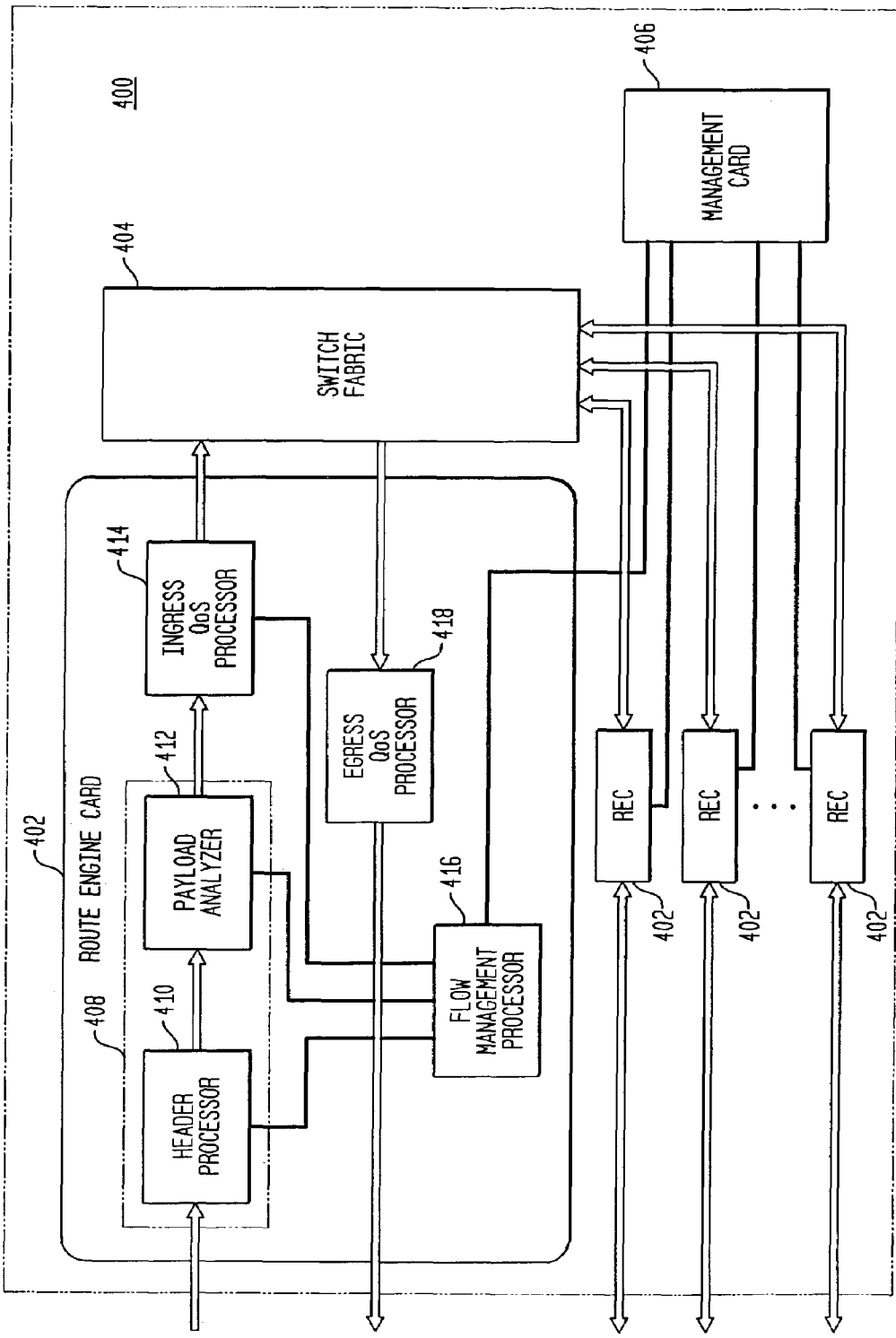
FIG. 4 is a block diagram of a routing network apparatus according to the present invention.

Referring now to FIG. 4, an embodiment of the network apparatus of the present invention with routing capabilities is described. Routing network apparatus 400 is formed by two or more route engine cards 402 connected to switch fabric 404. One or more management cards 406 are also included to provide a user interface and to manage route engine cards 402. Each of route engine cards 402 operate fundamentally as described with respect to network apparatus 100 of FIG. 2. Traffic flow scanning engine 408, formed by header processor 410 and payload analyzer 412, scans the contents of the data packets and generates a conclusion based on the contents. The packets and associated conclusions are forwarded to ingress QoS processor 414, which assigns the packets to a QoS queue. The data packets are then sent to the switch fabric, which forwards the data packets to the proper route engine card 402 for it's assigned output port. The data packet then flows through the egress QoS processor 418, which schedules the traffic received from all the route engine cards 402 for transmission onto the network. The microprocessor 124 shown in FIG. 2 could be present on the route engine card 402 or could potentially be moved to the management card 406 to allow one microprocessor to support multiple route engine cards 402. Each of the route engine cards 402 could even have its own microprocessor with an additional microprocessor on management card 406.

Having multiple route engine cards with multiple ingress and egress paths allows routing network apparatus to function as a routing network device, as opposed to the single ingress and egress path of the "bump-in-the-line" device described with respect to FIG. 2. This allows the routing functions of header processor 410 to be utilized in routing network apparatus 400.

Referring now to FIG. 5, a method of enforcing resource allocation defined in Service Level Agreements according to the present invention is shown. The method begins at start block 500 and proceeds to block 502, where a data packet is received by the network device, associated with a particular customer, and classified according to its contents. As discussed with reference to FIGS. 2-4 above, the network device is operable to scan the header information of each packet and determine, among other things, a source address, source port, destination address and destination port. This information can be used to determine if the data packet belongs to a registered customer with a set of programmed policies residing on the network device. Also discussed above, the network device is operable to scan the contents of each data packet and determine the type of content, such as email, web surfing, VoIP, video, file transfers, etc., so that the contents can be used in the handling of the data packet. The type of traffic is important for enforcing service level agreements as will be discussed.

Once a customer, if any, has been identified and the type of contents classified, the process passes to block 504, which determines whether the contents contain real time ("RT") traffic or non-real time ("NRT") traffic. Real time traffic includes VoIP, video, and other streaming or real time content, while non-real time traffic is content such as email, web surfing, file transfer protocol ("ftp"), etc. If the contents are classified as non-real time traffic the method passes to block 506, which looks at the available capacity for the quality of service (QoS) or class of service (CoS) queue associated with the particular traffic type. For example, for each subscriber or customer, each non-real time traffic types such as email, web traffic, ftp, etc., can have a QoS or CoS queue associated with it. When a data packet associated with a subscriber and traffic type is identified, the associated queue is checked for available bandwidth as defined in the subscriber's policies and profile. Available bandwidth is determined by comparing the maximum bandwidth ($C_x$), as defined in the subscriber's policies, minus the used bandwidth ($A_x$) with a unit bandwidth for that particular traffic type ($P_x$) which can also be defined on a subscriber basis. The unit bandwidth $P_x$ is the amount of bandwidth generally required for a session of that traffic type. The queue will be determined to have available bandwidth if $P_x<C_x-A_x$. Block 508 looks at the result of the comparison and determines if enough capacity is available per the service level agreement.

If there is enough available bandwidth in the queue for that type of traffic then the method passes to block 510 where the data packet is passed to the associated queue, which in the preferred embodiment is a variable bit rate queue although a constant bit rate or other type of queue could be used. The method then passes to block 512 where the available capacity, as reserved according to the subscriber policies, is decremented by the unit capacity, or $A_x=A_x+P_x$. The method then ends as represented by block 540.

Referring again to block 508, if the queue associated with the traffic type is determined not to have enough capacity then the method then passes to block 516. Block 516 checks to see whether other non-real time queues associated with the subscriber have available bandwidth. Since the type of traffic has already been determined to be non-real time, latency or delay is not of particular concern. Because this is true, the method is able to look for unused subscriber capacity on other non-real time queues in order to send the data packet. If available capacity is found on another queue, $P_x<C_y-A_y$, the data packet is sent to the alternate queue, which is also preferably a variable bit rate queue. Additionally, a factor can be built into the checking of alternate queues to ensure that there is capacity for data of the type the queue has been specifically allocated for, such that the diverted traffic does not fill up the queue. This factor $R_y$ would be added to the used space $A_y$, making the new comparison $P_x<C_y-A_y-R_y$. Block 512 represents the available capacity of the alternate queue being decremented by the unit capacity of the type of traffic actually in the data packet sent to the queue, $A_y=A_y+P_x$, with the process ending at block 540.

If block 518 determines that there is no other non-real time queue with available capacity, the method passes to block 524, which represents the data packet being sent to an available bit rate queue for best efforts processing. Best efforts processing uses any bandwidth left over after all of the other queues have been serviced. If there is no left over bandwidth, data packets in the available bandwidth queues are selectively dropped.

Returning to block 504, if the type of traffic is determined to be real time traffic, such as voice, video, etc., the method passes to block 526 which looks at the size of the data packet ($L_r$) and the available capacity ($A_r$) of its associated queue. For real time traffic queues, the queue is allocated bandwidth over time, this allocated bandwidth is sometimes analogized as tokens. When a data packet arrives, the length of the data packet is compared with the available capacity that has accumulated until that point as shown in block 528. If the length of the data packet is less than the accumulated available bandwidth, $L_r<A_r$, the data packet is sent to the real time queue associated with that type of traffic, the queue preferably being a variable bit rate queue as shown by block 530. Because the traffic is real time, if block 528 determines that there is not available capacity for the data packet, the data packet is marked for deletion in block 534 before being sent to the queue to be deleted, as shown by block 536. Because of lag and delay, looking for bandwidth in other queues is not a viable solution for real time data. As a result, data packets that cannot be accommodated on the associated queue are dropped. Block 540 again represents the end of the process.

In the preferred embodiment, the traffic flow scanning processor 140 from FIG. 2 is operable to perform the policing function to enforce the subscriber policies and profiles. The traffic flow scanning engine compares the traffic flows to the associated subscriber policies and assigns data packets from the traffic flows to a QoS queue in the QoS processor 116 based on the results of its policy enforcement. The QoS queues in the QoS processor perform traffic shaping and scheduling and send the data packets to an associated class of service queue as required.

One skilled in the art will readily understand that the ability to define the maximum capacity of each of the individual queues, $C_x$, $C_y$, etc., allows the network device to define the available bandwidth for each individual customer or subscriber, up to the maximum bandwidth of the actual physical connection. This ability allows for the provider to provide customers with a customizable and dynamic bandwidth allocated according to the customers' needs and desires instead of forcing them to purchase expensive predefined connections that may have excessive bandwidth such as T1 lines.

While the header processor, the QoS processors, and the flow management processor described with reference to FIGS. 2 and 4 can be any suitable processor capable of executing the described functions, in the preferred embodiment the header processor is the Fast Pattern Processor (FPP), the QoS processor is the Routing Switch Processor (RSP), and the flow management processor is the ASI processor, all manufactured by the Agere Division of Lucent Technologies, Austin Tex. Similarly the switch fabric may be any suitable switch fabric as is well known in the industry, including those manufactured by Power X Networks, Inc., 2833 Junction Ave., Suite 110, San Jose, Calif. The microprocessor described with reference to FIGS. 2 and 4 could be any suitable microprocessor including the PowerPC line of microprocessors from Motorola, Inc., or the X86 or Pentium line of microprocessors available from Intel Corporation. Although particular references have been made to specific protocols, implementations and materials, those skilled in the art should understand that the network apparatus, both the "bump-in-the-line" and the routing apparatus can function independent of protocol, and in a variety of different implementations without departing from the scope of the invention.

Although the present invention has been described in detail, those skilled in the art should understand that they can make various changes, substitutions and alterations herein without departing from the spirit and scope of the invention in its broadest form.

We claim:

1. A network device for enforcing service level agreements between a provider and a customer set relating to a network having network traffic composed of data packets, the network device comprising:
   memory for storing customer information, statistics and policies, the policies defining network attributes and services agreed to in the service level agreement;
   a traffic flow scanning processor connected to the memory for scanning data packets, associating the data packets with a particular customer from the customer set, and determining a treatment for the data packets based on the policies for the particular customer; and
   a quality of service processor connected to the traffic flow scanning processor and including a plurality of queues to process the data packets according to the treatment determined by the traffic flow scanning processor, wherein the network device checks for available bandwidth for each of the data packets by comparing available capacity for a particular type of network traffic contained within the data packets with a predetermined unit capacity associated with the particular type of network traffic, such that if the available capacity is greater than the unit capacity there is available bandwidth for the data packets.

2. The network device of claim 1 wherein the policies define maximum capacities for each type of network traffic, each of the maximum capacities being programmable, wherein the sum of the maximum capacities define the bandwidth allocated to the customer.

3. The network device of claim 1 wherein the traffic flow scanning processor classifies the data packets as real time traffic or non-real time traffic.

4. The network device of claim 3 wherein data packets associated with non-real time type network traffic that does not have available bandwidth are sent to queues associated with another non-real time traffic type for the customer.

5. The network device of claim 1 wherein the traffic flow scanning processor and the quality of service processor are further able to provide security services for the customer.

6. The network device of claim 1 wherein the network traffic includes real time video, voice over IP, email, web surfing, and file transfers.

7. The network device of claim 1 wherein the memory also stores event information per subscriber.

8. The network device of claim 1 wherein the treatment includes modifying the data packet.

9. A method for enforcing resource allocation in service level agreements for a data network including a plurality of traffic flows each formed by a plurality of data packets, the method comprising:
   associating a data packet with a particular customer;
   classifying contents of the data packet, the contents being classified as a type of traffic that is real time or non-real time;
   checking for available bandwidth according to preprogrammed policies for the particular customer and the type of traffic; and
   sending the data packet to an appropriate quality of service queue based on the type of traffic and available bandwidth according to the preprogrammed policies, wherein real time traffic is marked for deletion when there is not available bandwidth in the associated quality of service queue.

10. The method of claim 9 wherein non-real time traffic includes a plurality of types of network traffic each of the plurality of types of network traffic having a quality of service queue with a predetermined capacity based on the preprogrammed policies such that if there is not available bandwidth in the quality of service queue associated with the type of traffic the method checks for available bandwidth in quality of service queues associated with other non-real time types of network traffic.

11. The method of claim 10 wherein data packets associated with non-real time traffic are sent to a best efforts quality of service queue when there is not available bandwidth in the associated quality of service queue or in other non-real time quality of service queues.

12. The method of claim 9 wherein checking for available bandwidth includes comparing available capacity with a predetermined unit capacity associated with the particular type of traffic, such that if the available capacity is greater than the unit capacity there is available bandwidth for the data packet.

13. The method of claim 10 wherein the total bandwidth for the particular customer is the sum predetermined capacities for all traffic types.

* * * * *